Figure 1:
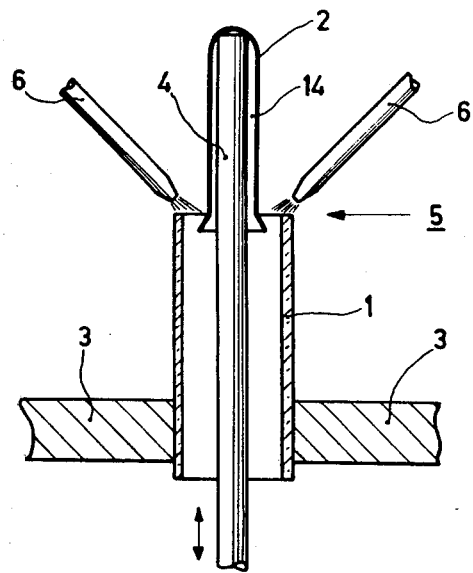

United States Patent [19]

Roelevink

[11] 4,001,000
[45] Jan. 4, 1977

[54] METHOD OF MANUFACTURING A PERCUSSION FLASHLAMP

[75] Inventor: Bauke Jacob Roelevink, Terneuzen, Netherlands

[73] Assignee: U.S. Philips Corporation, New York, N.Y.

[22] Filed: Oct. 22, 1975

[21] Appl. No.: 624,728

Related U.S. Application Data

[63] Continuation of Ser. No. 446,232, March 29, 1974, abandoned.

[30] Foreign Application Priority Data

Apr. 17, 1973 Netherlands .................. 7305332

[52] U.S. Cl. .............................. 65/59 A; 65/34; 65/154; 65/155
[51] Int. Cl.² ................................ C03C 27/02
[58] Field of Search .......... 65/59 A, 59 R, 34, 559, 65/154, 155

[56] References Cited

UNITED STATES PATENTS

| 3,598,555 | 8/1971 | Gennocro | 65/59 A |
| 3,832,124 | 8/1974 | Loughridge | 65/59 A |
| 3,858,378 | 1/1975 | Allen et al. | 65/59 A |

Primary Examiner—Robert L. Lindsay, Jr.
Assistant Examiner—Frank W. Miga
Attorney, Agent, or Firm—Frank R. Trifari; Robert S. Smith

[57] ABSTRACT

The invention relates to a method of manufacturing a percussion flashlamp in which a metal tube which is closed at one end is sealed to a piece of cylindrical tube glass, during which sealing operation the metal tube is supported by a pin which projects through the tube glass into the metal tube and which holds the closed end of the metal tube above the tube glass.

2 Claims, 2 Drawing Figures

U.S. Patent   Jan. 4, 1977   4,001,000

METHOD OF MANUFACTURING A PERCUSSION FLASHLAMP

This is a continuation of application Ser. No. 446,232, filed Mar. 29, 1974, now abandoned.

The invention relates to a method of manufacturing a percussion flashlamp in which a metal tube which is open at one end and a piece of cylindrical tube glass are positioned relative to each other by means of holding members in such manner that the metal tube extends inside the piece of tube glass with its open end, after which the piece of tube glass and the metal tube are subjected to a sealing operation. Such a method is known.

After said sealing operation the metal tube is provided with an anvil and an ignition mass to form an ignition device, and the piece of tube glass is filled with a combustible material and a gas maintaining the combustion, after which the tube glass is sealed at its end remote from the ignition device.

In the known method, the metal tube and the piece of tube glass are each supported by tongs, in which during the sealing operation the piece of tube glass is present substantially entirely above the metal tube. At the area of the sealing zone the metal tube extends in the piece of tube glass over a distance of approximately 3 mm. The supply of thermal energy to the sealing zone is effected by means of burners which are directed between the tongs which clamp the metal tube and the lower side of the piece of tube glass. Since the tongs which clamp the metal tube serve as a heat conductor, the distance between the lower side of the piece of tube glass and the tongs for the metal tube should be comparatively large so as to enable a uniform heating of the glass and the metal in order that it is achieved that at the instant of sealing the temperature of the metal and the glass be substantially the same. This requirement involves the drawback that for the manufacture a larger length of tube is required than is necessary for a good operation of the ignition device.

It is the object of the invention to provide a method which does not exhibit this drawback. For that purpose the method according to the invention is characterized in that during the sealing operation the metal tube is held, with its closed end uppermost, by means of a pin projecting through the piece of tube glass into the metal tube. Since the pin is present within the metal tube and the tube glass, sufficient space is available on the outside for the most suitable arrangement of the burners, so that a good supply of thermal energy to the sealing zone can be realised. As a result of this the possibility of leakage of the seal is prevented.

As compared with the known method, the method according to the invention still provides another important advantage. In the known method, actually, a favourable arrangement of the burners is prevented by the presence of the tongs. This results in an inaccurate supply of thermal energy so that not only the portion of the piece of tube glass to be sealed to the metal tube but also the adjacent portion are softened. As a result of this, the latter portion also will be slightly constricted during sealing so that a conical transition from the tube glass to the metal tube is formed.

In the method according to the invention on the contrary the burners can be directed accurately onto the portion of the piece of tube glass to be sealed so that only this portion and not the adjacent portion of the tube glass is softened. As a result of this, only the portion of the tube glass to be sealed will be constricted so that the forming transition from the tube glass to the metal tube obtains a more or less angular shape which is favourable in connection with the volume of the lamp envelope to be formed. Measurements have proved that the volume of a flash-lamp which is manufactured according to the method of the invention is approximately 8% larger than the volume of a flashlamp manufactured according to the known method and having the same length and diameter.

The height of the pin is preferably adjustable in the longitudinal direction of the piece of tube glass so that the open end of the metal tube can be positioned relative to the tube glass at the height suitable for sealing. The portion of the metal tube projecting from the lamp envelope of a percussion lamp thus manufactured is only determined by the length of tube required for clamping in a flashlamp device and by the thickness of a percussion member which is suitable to percuss against the metal tube in a lateral direction and hence fire the flashlamp.

A favourable embodiment of the method according to the invention is characterized in that the diameter of at least the portion of the pin which is present inside the metal tube is smaller than the inner diameter of the metal tube so that a heat insulating gap is present between the inner wall of the metal tube and the pin. The gap between the inner wall of the metal tube and the pin prevents a rapid dissipation of thermal energy so that a uniform heating of the glass and the metal is promoted, which is in favour of the quality of the seal.

A further favourable embodiment of the method according to the invention is characterized in that the pin consists of a material having a low coefficient of thermal conductivity. As a result of this the dissipation of thermal energy from the sealing zone during the sealing operation is extra delayed.

The invention furthermore relates to a percussion flashlamp manufactured according to the method of the invention.

Figure 2:
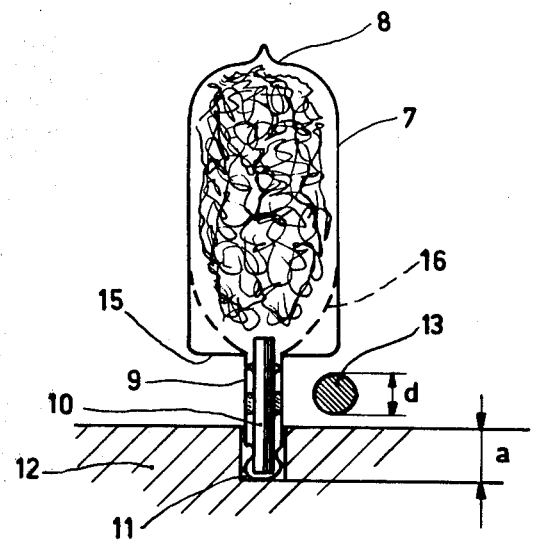

The invention will be described in greater detail with reference to the drawing, in which FIG. 1 shows the positions assumed during sealing by the metal tube and the piece of tube glass, as well as the supporting means, and FIG. 2 shows a flashlamp according to the invention.

Reference numeral 1 in FIG. 1 denotes the cylindrical piece of tube glass and reference numeral 2 denotes the metal tube. The piece of tube glass is supported by a holding member 3 in the form of tongs shown diagrammatically. The metal tube is supported by a pin 4 manufactured from tungsten and projecting through the tube glass 1 and into the metal tube 2. The pin 4 can be adjusted in the direction of height relative to the tongs 3. This enables the adjustment of the pin 4 and the tongs 3 relative to each other for the sealing operation in such manner that the metal tube projects into the tube glass with its open end over a distance of approximately 3 mm. In this position the metal tube is sealed to the tube glass by means of a number of burners which are denoted by 6 and which in this embodiment enclose an angle of 45° with the horizontal so that the end portions of the metal tube and the tube glass to be sealed together are heated rapidly and uniformly. The diameter of the pin in this embodiment is 0.2 mm smaller than the inside diameter of the metal tube, so that a heat insulating air gap 14 is formed.

The percussion flashlamp shown in FIG. 2 comprises a lamp envelope 7 of a transparent material, for example glass, in which are present a metal which emanates actinic light upon combustion and a gas which maintains the combustion. The lamp envelope is sealed at its upper end 8. On the lower side of the flashlamp an ignition device is present which contains the sealed metal tube 9. An anvil 10 in the form of metal wire which extends coaxially with the tube is arranged in said metal tube. An ignition mass is present in the space between the anvil and the inner wall of the metal tube, which mass can be ignited by means of a percussion exerted on the tube in the lateral direction. The minimum length of the portion of the metal tube which projects beyond the lamp envelope is in this percussion flash lamp determined by the distance $a$ over which the tube is incorporated in the recess denoted by 11 of a base plate 12 of a flashlamp unit and by the thickness $d$ of the percussion member 13 of said flash unit.

As shown in FIG. 2, the lamp envelope of the flashlamp has a flat bottom. For comparison, the shape of the bottom, of a percussion flashlamp manufactured in known manner is denoted in broken lines 16. The volume of the lamp vessel of the percussion flashlamp according to the invention is 8% larger.

What is claimed is:
1. A method of manufacturing a percussion flashlamp which comprises: providing a metal tube having a cylindrical section, one end of which is open and one end of which is closed and a cylindrical glass tube, positioning said glass tube relative to said metal tube in generally axially aligned relationship with an axial section of each in concentric relationship, holding said relationships with at least one holding member which includes an elongated pin, said positioning step including positioning said pin in generally coaxial relationship to each of said tubes and, radially spaced from the interior of all of said cylindrical section of said metal tube with an axial extremity of said pin engaging only said closed end of said metal tube, said metal tube being held on said pin only by gravity, sealing said glass tube to said metal tube by heating, and withdrawing said metal pin from said metal tube, said tubes being radially spaced to avoid conduction of heat away from the area where said glass and metal tubes are joined.

2. A method of manufacturing a percussion flashlamp as claimed in claim 1, wherein said pin consists of a material having a low coefficient of thermal conductivity to avoid conducting heat away from the area where said glass and metal tubes are joined.

* * * * *

UNITED STATES PATENT AND TRADEMARK OFFICE
CERTIFICATE OF CORRECTION

PATENT NO. : 4,001,000
DATED : January 4, 1977
INVENTOR(S) : BAUKE JACOB ROELEVINK It is certified that error appears in the above-identified patent and that said Letters Patent are hereby corrected as shown below:

Title Page [63] - "446,232" should be --456,232--.

Column 1, line 6, "446,232" should be --456,232--.

Signed and Sealed this sixteenth Day of August 1977

[SEAL]

Attest:

RUTH C. MASON
Attesting Officer

C. MARSHALL DANN
Commissioner of Patents and Trademarks